Dec. 12, 1939.  E. W. HOLMES ET AL  2,183,478

AUTOMOBILE TOWING DEVICE

Filed Dec. 28, 1937  3 Sheets-Sheet 1

Inventors
ERNEST W. HOLMES
ERNEST W. HOLMES Jr.

By Norris + Bateman
Attorneys

Dec. 12, 1939.  E. W. HOLMES ET AL  2,183,478
AUTOMOBILE TOWING DEVICE
Filed Dec. 28, 1937  3 Sheets-Sheet 2

Inventors
ERNEST W. HOLMES
ERNEST W. HOLMES JR.
Attorneys

Dec. 12, 1939.  E. W. HOLMES ET AL.  2,183,478
AUTOMOBILE TOWING DEVICE
Filed Dec. 28, 1937   3 Sheets-Sheet 3
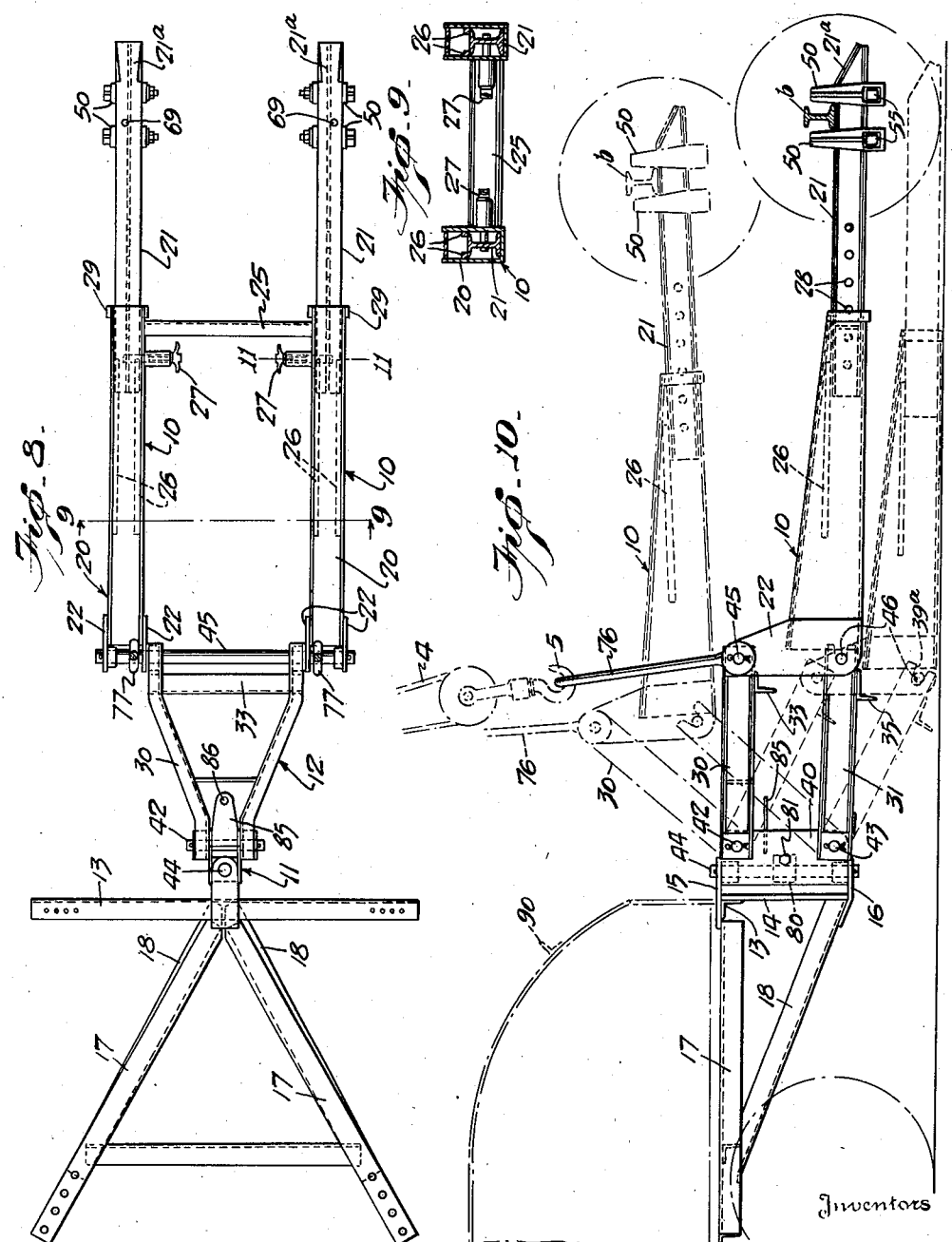
Inventors
ERNEST W. HOLMES
ERNEST W. HOLMES JR.
By Norris + Bateman
Attorneys Patented Dec. 12, 1939

2,183,478

UNITED STATES PATENT OFFICE 2,183,478

AUTOMOBILE TOWING DEVICE

Ernest W. Holmes and Ernest W. Holmes, Jr., Chattanooga, Tenn., assignors to Ernest Holmes Company, Chattanooga, Tenn., a corporation of Tennessee Application December 28, 1937, Serial No. 182,114

22 Claims. (Cl. 212—141)

The present invention relates to improvements in towing devices, and more particularly to those of the class adapted to be mounted on a service car or wrecking truck for towing disabled automobiles and the like.

One of the primary objects of the invention is to provide a novel and improved device of this character which is capable of lifting and towing automobiles of the present day types having low hung mud shields and splash pans at the front or rear without damaging such parts of the towed automobile.

Another object is to provide a device of this character which may be extended from the rear end of a service car or truck for lifting and towing purposes, but which, when not in use, may be readily folded compactly into the car or truck so that it does not project therefrom, which would be objectionable, although the device may be easily and quickly brought into position for use when desired.

Another object is to provide a device of this character which is so pivoted to the service or towing car as to cause the towed car or automobile to follow in the same path therewith or without swinging laterally thereof, especially when making a turn or travelling around a curve in the street or road, thus avoiding danger of collision of the towed vehicle with other vehicles or objects along the street or road.

Another object is to provide a device of this character wherein the lifting member for the towed vehicle may extend a considerable distance from the rear of the towing vehicle and may support the towed vehicle on or near its rear end but the load on the lifting cable or other lifting means will be no greater than the weight of the forward end of the towed vehicle and of the lifting member.

Another object of the invention is to provide a lifting member for the towed vehicle which is provided with clamps which may be readily applied thereto and fixed in positions in front of and behind the axle or other suitable part of the vehicle to be towed after the lifting member has been brought into position beneath such axle or part, such clamps securing the towed vehicle to the lifting member so that it will not become dislodged therefrom while being towed, and also preventing lateral swing of the disabled vehicle while being towed.

To these and other ends, the invention consists of certain improvements and combinations and arrangements of parts all as will be hereinafter more fully described, the features of novelty being pointed out more particularly in the claims at the end of this specification.

In the accompanying drawings—

Fig. 1 is a side elevation of a towing device embodying the present invention, the device being shown mounted upon a service car or wrecking truck and in lifted position for towing a vehicle;

Fig. 2 is a side elevation of the device, on an enlarged scale, showing the same folded into the service car or truck, as when not in use;

Fig. 3 is a rear elevation of the device as shown in Fig. 2;

Fig. 4 is a view similar to Fig. 2 but illustrating diagrammatically the manner in which the device is unfolded and brought into condition for use;

Fig. 5 is a perspective view showing collectively the parts comprising the towing device;

Fig. 6 is a detail view, on an enlarged scale, showing one of the rails of the lifting member in cross section and one of the axle clamps thereon;

Fig. 7 is a side elevation of the parts shown in Fig. 6 as viewed from the right in that figure;

Fig. 8 is a top plan view of the towing device, showing the same in its extended condition;

Fig. 9 is a detail cross section through the lifting member, taken on the line 9—9 in Fig. 8;

Fig. 10 is a side elevation of the towing device showing diagrammatically the manner in which the lifting member is placed beneath the axle of the vehicle to be towed and is lifted into towing position;

Fig. 11 is an enlarged detail cross section taken on the line 11—11, Fig. 8;

Figs. 12 and 13 are views in elevation and top plan respectively of an accessory for lifting automobiles having so-called "knee action" front axles; and Fig. 14 is a perspective view of another accessory.

Similar parts are designated by the same reference characters in the several figures.

The towing device provided by the present invention is particularly adapted to be mounted upon a service car or wrecking truck in a position for lifting and towing a disabled automobile or other vehicle.

In the present instance the towing device is mounted on a service car, wrecking truck or other suitable automotive vehicle A which may be similar to wrecking trucks such as those now commonly used, the wrecking truck to which the towing device is shown applied in the present instance having a derrick 1 mounted thereon, the derrick having a boom 2 which extends rearwardly and is provided with a sheave 3 which is located above and slightly beyond the rear end of the wrecking truck, a hoisting cable 4 extending over this sheave and carrying a lifting hook 5 which may be raised and lowered by hoisting mechanism on the wrecking truck which operates the cable 4 by hand or power or in any other suitable or well known way, the wrecking truck and derrick shown in the present instance being for example of the type shown and described generally in U. S. Letters Patent Reissue No. 14,720, granted Sept. 2, 1919.

The towing device, according to the present invention, comprises in general, a lifting member 10 for lifting the vehicle to be towed, a support or mounting 11 secured to the service car or wrecking truck, and connecting means 12 between the lifting member and support which is operative to maintain the lifting member in substantially horizontal position during the raising and lowering thereof.

The support 11 comprises preferably a frame composed of a cross member 13 preferably of angle iron adapted to be bolted at its ends to the underside of the floor of the wrecking truck, an upright member 14 secured at its upper end to the member 13 and comprising upper and lower bearing lugs 15 and 16, a pair of members 17 composed preferably of angle iron which are secured to and extend divergently forwardly from the point of attachment of the upright 14 to the cross member 13, the forward ends of these members 17 being bolted or otherwise secured to the underside of the floor of the wrecking truck, and a pair of members 18 which are composed preferably of angle iron the rear ends of which are fixed to the lower end of the upright 14, these members extending divergently forwardly and being secured to the undersides of the divergent members 17. The framework, composed of the members just described and which are welded or otherwise rigidly fixed together, provides means by which the upright member 14 may be readily mounted rigidly on the rear end of the service car or wrecking truck.

The lifting member 10 is preferably in the form of a cradle or platform of elongated form adapted to project from the rear of the wrecking truck and to be placed beneath the front or rear axle or other part of an automobile or the like for lifting and towing it, and it is preferably telescopic so that the towed vehicle may be supported thereon as close as possible to the rear end of the towing vehicle. The lifting member as shown in the present instance comprises a pair of rigid side members comprising sections 20 which are box-like in form, and sections 21 which are telescoped therein and are of I-beam or other rigid form. The members 20 are rigidly connected by a cross member 25 which may be welded or otherwise rigidly secured thereto toward their outer ends to maintain these members in parallelism, and the forward ends of these members have pairs of plates 22 welded or otherwise fixed thereto, these plates being provided with upper and lower pairs of aligned apertures 23 and 24. Longitudinal guide rails 26 are secured in the upper portions of the respective sections 20 to engage the upper sides of the telescopic sections 21 and firmly support them and the load imposed thereon, and the sections 21 are secured in different extended relations with the sections 20 by spring plungers 27 which are mounted on the sections 20 and engageable in longitudinally spaced holes 28 formed in the webs of the sections 21. The outer open ends of the sections 20 are preferably reinforced by metal bands 29 which may be welded or otherwise suitably secured thereto.

The connection 12 between the lifting member 10 and the support 11 comprises upper and lower link members 30 and 31 which are pivotally connected to the lifting member and support and provide a substantially parallel motion connection between these parts. The upper link member 30 comprises a pair of side elements 32 which are preferably of channel form, these side elements being rigidly connected by cross bars 33 preferably of angle iron which may be welded or otherwise fixed thereto, and the lower link member 31 comprises similar side elements 34 which may be rigidly connected by a cross bar 35 preferably of angle form welded or otherwise fixed thereto.

The forward ends of the side elements 32 and 34 of the link members 30 and 31 respectively have bearing blocks 36 and 37 welded or otherwise secured in their outer channeled sides, and the rear ends of the side elements of these link members also have bearing blocks 38 and 39 welded or otherwise fixed in their outer channeled sides. The forward ends of the link members 30 and 31 are adapted to straddle a pivot member or support comprising a pair of vertical plates 40 which are secured together by a pair of bearing blocks 41 which are welded or otherwise secured between them, the link members being pivotally connected to said pivot member by upper and lower pivot pins 42 and 43 which extend through apertures in the upper and lower portions respectively of the plates 40 and through the bearing blocks 36 and 37 respectively of the upper and lower link members. The pivot member comprising the plates 40 is interposed between the upper and lower bearing members 15 and 16 of the support on the wrecking truck, and it is supported to swing about a vertical axis by a vertical pivot pin 44 which is fixed in and extends through the upper and lower bearing members 15 and 16 and extends rotatably through the upper and lower bearing blocks 41. The rear ends of the link members 30 and 31 are splayed or divergent and are adapted to be received between the innermost plates 22 on the lifting member. The rear ends of the upper link member 30 are pivotally connected to the upper portions of the plates 22 by a pivot pin 45 which extends through the aligned apertures 23 in the upper ends of these plates and through the bearing blocks 38 on the rear ends of the link member 30, and the rear ends of the lower link member 31 are pivotally connected to the lifting member by engagement with a pivot pin 46 which extends through the aligned apertures 24 in the lower portions of the plates 22, the pivot pin 46 extending through the bearing blocks 39 secured to the rear ends of the side members 34 of the lower link member. This pivotal connection between the rear ends of the link member 31 and the lifting member is a detachable one to permit folding of the lifting member when not in use, for which purpose the bearing members 39 are provided with slots 39ª through which the pivot pin 46 may enter and disengage from the lower link member.

Different accessory fittings may be provided for the sections 21 of the lifting member to facilitate the lifting of different kinds of vehicles by different portions thereof and which when applied thereto will prevent dislodging of the towed vehicle therefrom. Figs. 6 and 7 show, for example, a clamp which comprises a member 50 of a form to fit beneath and against one side of the respective section 21, and a cooperating member 51 to engage the opposite side of said section. Preferably and as shown, the member 50 is formed with an undercut recess or notch 52 into which one edge of the base flange of the section 21 may fit, and the clamping member 51 has a pair of lugs 53 and 54 thereon, the lug 53 being engageable over the other base flange of the section 21 and the lug 54 being engageable beneath the cooperating clamping member 50. A bolt 55 extends through the lower portion of the clamping member 50 and through the cooperating clamping member 51 and is provided with a nut 56 by means of which it may be tightened, the clamp, when tightened, being firmly fixed against longitudinal movement along the respective section 21. The member 50 of each clamp projects above the respective section 21, and when a pair of these clamps are placed on each section 21 of the lifting member they may be brought against the opposite sides of the axle of the towed vehicle, as shown in Fig. 10, and when tightened, they will prevent longitudinal displacement of the towed vehicle from the lifting member. The member 50 of each clamp may be formed with an eye 57 through which a chain may be passed, if desired, to prevent vertical or horizontal or lateral displacement of the axle of the towed vehicle from the lifting member.

In order to adapt the lifting member or cradle to the lifting of automobiles the front axles of which are provided with the so-called "knee action", in which the front wheels are mounted on levers 60 pivoted to the axle proper and having ring-like spring cups 61 on which the coil springs 62 supporting the front end of the automobile rest, an adaptor bar 63 as shown in Figs. 12 and 13 is provided. This adaptor bar is composed preferably of channel iron of a length to extend across the sections 21 of the lifting member or cradle, the ends of the bar being bent or sloped downwardly as at 64 and provided with longitudinal slots 65 to receive bolts 66, and hemispherical balls 67 are mounted on the upper sides of the downwardly sloping ends of the bar, and have central hubs which extend through the slots and are provided at their lower ends with washers 67ª which bridge the slots and are clamped against the lower ends of the hubs by the bolts 66 which extend through them, the washers being spaced slightly from the under side of the bar, so that the balls are freely movable longitudinally of the bar and may automatically adjust themselves into different positions to accommodate them to the spring centers of cars of different makes. The forward edge of the bar has a pair of hooks 68 fixed thereto, and the upper outer flanges of the lifting member sections 21 are provided with holes 69 to receive these hooks. When using such an adaptor, it is first placed on the sections 21 with its forward edge resting on the tops thereof and the ends of the hooks 68 entered in the holes 69 and the bar is then turned so that it rests flatwise on the sections 21. When the sections 21 are lifted to bring the balls 67 into the openings in the centers of the spring cups, the balls will accommodate themselves to the size of such openings and will adjust themselves along the bar 63 according to the distance apart of the spring cups on the particular automobile being lifted, the bolts 66 serving to prevent detachment of the balls from the bar. The ball and socket engagement thus provided between the balls and the spring cups compensates for the pivotal movement taking place between the lifting cradle and the vehicle to be towed during lifting and while being towed, and the weight of such vehicle resting on the spring cups will retain the latter in engagement with the balls during towing, without requiring any other securing means between the lifting cradle and the vehicle being towed. The hooks 68 engaging in the holes in the sections 21 of the cradle will prevent dislodgment of the bar 63, either longitudinally or laterally of the lifting cradle. It will be understood that when this "knee-action" adaptor bar is used, the clamps previously described are removed from the lifting cradle as their use is then unnecessary.

In place of the "knee-action" adaptor bar, a pair of accessory fittings 70 as shown in Fig. 5 may be used in conjunction with the clamps for lifting an axle of a vehicle to be towed before the sections 20 engage lighter metal parts of the vehicle. These fittings each comprise a plate the longitudinal edges of which are bent downwardly and inwardly to embrace the longitudinal top flanges of the cradle sections 21, they being placed on or removed from these sections by endwise movement thereon, and they may be secured against longitudinal displacement on said sections by applying the clamps 50 to the sections 21 of the lifting member in the manner hereinbefore described, the outer longitudinal edges of these fittings being cut away as at 71 to enable the clamps 50 to be applied at opposite sides of these fittings and sufficiently close together to prevent longitudinal shifting of these fittings or of the axle resting thereon. Upstanding flanges or ribs 72 on the upper sides of these fittings provide surfaces below the tops of the clamps to engage the under side of the axle or other suitable part of an automobile for lifting it. Fig. 14 shows another form of fitting that may be applied to each of the cradle sections 21 in place of those hereinbefore described, the fitting in this instance comprising a plate 73 the longitudinal edges of which are turned downwardly and inwardly to embrace the longitudinal edges of the top flanges of the respective cradle sections 21, these fittings being slidable longitudinally onto and off of the cradle sections and secured against longitudinal displacement therefrom by bolts which may be passed through holes 74 in these fittings and the holes 69 in the cradle sections 21. The upper side of each of these fittings is provided with a pair of lugs 75 the adjacent sides of which are convergent downwardly so that they will position and retain an axle or other part of a vehicle placed between them.

The rear extremities of the sections 21 of the cradle or lifting member are preferably bevelled or inclined, as shown at 21ª so that, in the event the axle of the vehicle to be lifted or towed rests on the ground or the sections 21 for any other reason can not be placed beneath the axle, a cable from the hoisting derrick of the lifting crane may be attached to the end of the disabled vehicle and the latter pulled up these bevelled or inclined surfaces onto the lifting cradle, without encountering any obstruction.

The lifting member is raised and lowered by a yoke 76 having apertured terminal plates 77 which are interposed between the pairs of plates 22 on the lifting member and through which the pivot pin 45 extends, this yoke being adapted to be engaged by the lifting hook 5 of the hoisting cable. In order to prevent swinging of the lifting cradle laterally by its own weight while suspended by the lifting hook 5 and before the cradle is placed beneath the vehicle to be lifted and towed, as when the towing truck or service car is on a side of a crowned road, a brake or controlling device is provided which comprises preferably a block 80 of brass or other suitable material which is bored to receive the vertical pivot pin 44 and is split radially at one side and provided with a screw 81 which may extend through one of the plates 40, this screw being operative to clamp the block frictionally on said pivot pin. The block is fitted between the plates 40 which swing about the pivot pin 44 as a center so that the block will swing or rotate with said plates, and since the pivot pin 44 is fixed against rotation in its upper and lower supports 15 and 16, the block 80 may be adjusted by the screw 81 to produce sufficient friction on the pivot pin 44 to resist any tendency of the lifting cradle to swing laterally, by its own weight, toward the low side of the towing truck when the latter is standing on one side of a crowned road, thus enabling the driver of the towing truck to introduce the lifting cradle beneath a vehicle to be towed without requiring the services of an attendant to direct the cradle during this operation. Of course, the friction produced by the block on the pivot pin 44 will not be sufficient to interfere with the swinging movements of the cradle about this pivot pin during the towing of a vehicle, as when turning a corner.

In some instances, it might be expedient to lift the vehicle to be towed directly by the hoisting hook 5, in which event it may be desirable to use a towing head like that shown in prior Patent No. 1,435,063 granted Nov. 7, 1922, to prevent side-sway of the vehicle being towed. For this purpose, a pair of pivot lugs 85 are fixed to the plates 40 to extend rearwardly therefrom, these upper and lower lugs being apertured at 86 to receive a pivot pin to which the forward ends of the members of the towing head may be connected.

The mode of operation of the towing device, constructed as hereinbefore described, in lifting and towing an ordinary automobile, is as follows. Assuming the lifting cradle or member 10 to be in its operative position and projecting rearwardly from the rear end of the service car or wrecking truck, and the cradle or lifting member connected to the hoisting cable 4, the cradle or lifting member is adjusted so that it rests on or immediately above the surface of the pavement or road surface, as indicated by the dotted lines in Fig. 10, after which the wrecking truck may be backed to bring the rear end of the cradle or lifting member beneath the axle b of the disabled vehicle B. After the cradle or lifting member has been thus placed beneath the axle or other suitable part of the vehicle to be towed, it is raised or lifted by winding of the hoisting cable 4 attached to the yoke 76, in consequence of which the cradle or lifting member will lift the end of the disabled car adjacent to the rear end of the wrecking truck, into the position shown by the dot-and-dash lines in Fig. 10, or substantially so. The clamps 59 may then be applied to the sections 21 of the lifting member at opposite sides of the axle b and clamped in such positions, whereby longitudinal displacement of the disabled vehicle, during towing, will be prevented.

While the lifting member is held in its elevated position by the hoisting cable 4, the disabled vehicle may be towed to any desired destination. By applying chains to the clamps and axle as previously described, vertical or horizontal or lateral displacement of the axle of the vehicle during towing is prevented.

In lifting an automobile, using the fittings 70 or 73, the operation will be the same as just described except that these fittings will be applied to the lifting sections 21 before the latter are placed beneath and brought up against the axle of the vehicle to be towed, and when the fittings 73 are used it is not necessary to use the clamps.

In lifting the front end of an automobile provided with "knee-action", the adaptor bar 63 is placed on and secured to the cradle sections 21 in the manner hereinbefore described, after which the lifting cradle is placed beneath the front axle of the automobile to be towed, and as the cradle is lifted, the adaptor bar will accommodate itself to the spring cups on the front axle and will lift the front axle, including the front wheels, bodily.

During the lifting or lowering movements of the cradle or lifting member, through the action of the hoisting cable attached thereto by the yoke 76, the cradle or lifting member will remain in a substantially horizontal position, due to the parallel motion connection provided between it and the support on the wrecking truck. However, it is preferable that the pivots of the upper and lower link members 30 and 31 be so disposed that during the lifting and lowering movements of the cradle or lifting member, the rear end thereof will travel through a greateer distance than the end of the lifting member adjacent to the wrecking truck. For example, as shown in Fig. 10, the distance between the pivots 42 and 43 is slightly less than the distance between the pivots 45 and 46, the disposition of these pivots being such that when the lifting member is lowered onto the pavement or road surface it will lie substantially flatwise thereon but as the lifting member is raised its rear end will rise to a greater distance or more rapidly than its end connected to the link members. This arrangement compensates for the downward tilt of the rear end of the wrecking truck as the load of the disabled vehicle is imposed thereon, due to the compression of the springs and the tires of the rear wheels of the wrecking truck, and it also enables the forward end of the disabled vehicle to be raised to a greater height than would be the case if the lifting member were maintained in a truly horizontal position during its lifting and lowering movements, although such an arrangement may be used satisfactorily and is to be considered as within the scope of this invention.

During the towing of the disabled vehicle, the clamps, adaptor bar or other fittings on the lifting member engaging the axle of the vehicle being towed, will prevent turning of the towed vehicle laterally on the lifting member, thereby preventing lateral swing of the towed vehicle during the towing operation, and the location of the vertical pivot 44 at the rear end of the wrecking truck will cause the towed vehicle to follow closely in the path of the wrecking truck when the vehicle is being towed around a curve or corner in the road or street, thereby avoiding projection of the towed vehicle laterally from either side of the wrecking truck and avoiding collision with passing vehicles.

When the towing device is not in use, it may be folded into or onto the wrecking truck so that it will not project as an obstruction from the rear end of the truck. To fold the towing device, it is only necessary to lift its rear end and to swing the lifting member forwardly onto or into the wrecking truck. The first part of this lifting movement will remove the pivot pin 46 from the bearing blocks 39 of the lower link member 31, and as the upward and forward swing of the lifting member continues, it will pivot and swing about the pivot pins 42 and 45, as indicated by the dotted and full lines in Fig. 4, the lifting member eventually assuming a position on or in the wrecking truck as for example is shown in Fig. 2. In order to facilitate the folding of the towing device into the truck and removing it therefrom, the body of the wrecking truck is preferably provided with a cross bar 90 on which the lifting member may rest and slide, as shown by the full lines in Fig. 4, while the towing device is being folded into the truck or removed therefrom, thereby minimizing the extent to which the lifting member must be lifted by the operator during these operations. After the lifting member, together with the upper link member 30 have been folded, as shown for example in Fig. 2, the lower link member 31 may be swung upwardly about its pivot 43 into the folded position shown in Fig. 2 and may be removably secured in that position by a clamping bolt 91 which may be attached to the rear portion of the wrecking truck and engaged in a slot 92 in the cross member 35 secured to the lower link member 31. In order to bring the towing device into condition for use, it is only necessary to release and swing the lower link member 31 downwardly onto the pavement or road surface as shown in Figs. 4 and 10 and to swing the lifting member 10 rearwardly from the wrecking truck and then downwardly until it comes to rest flatwise on the pavement or road surface. As the lifting member comes to rest flatwise on the road or pavement surface, the pivot pin 46 will enter the slots 39ª in the bearing blocks 39 of the lower link member 31, and when the lifting hook 5 is attached to the lifting yoke 76, the towing device is ready for use.

The present invention provides a towing device which is especially adapted to meet the requirements in towing automobiles as now generally constructed with low hung mud shields and splash pans, and which has presented a problem due to the difficulty of avoiding damage to such light metal parts of such automobiles. Since the beam-like lifting member or platform, according to the present invention, is maintained in a substantially horizontal position, whether lowered or raised, it may be readily placed in position beneath the axle or other suitable part of the car to be towed, without striking such low hung mud shields or splash pans, and during and after lifting of the lifting member, the latter will be below such light metal parts of the disabled car so that relative movements such as may take place between the disabled car and the towing vehicle during the towing operation will not bring the towing device into contact with such light metal parts of the towed car to cause damage thereto.

Moreover, as the lifting member is maintained in a substantially horizontal position by the parallel motion linkage during the lifting of said member, the load on the lifting cable is the same as the weight of the forward end of the vehicle lifted by the lifting member together with the weight of the lifting member, or substantially so, irrespective of the distance of the point at which the towed vehicle rests on the lifting member from the lifting cable, with the advantage that the strain on the lifting cable and the amount of power required to wind or operate it are not increased although the towed vehicle may be supported on the towing device at a considerable distance behind the lifting cable or the rear end of the wrecking truck.

The parallel motion linkage connecting the lifting member to the support on the wrecking truck or towing vehicle may have its pivots so disposed as to maintain the lifting member in a truly horizontal position during raising and lowering thereof, although it is generally preferable to so dispose these pivots, as for example, as has been hereinbefore described, so that the rear or free end of the lifting member rises or lowers through a greater distance or at a greater rate than the other end thereof to which the links and lifting cable are connected in order to enable the rear end of the lifting member to rest on the pavement or road surface and to compensate for the downward tilt of the rear end of the wrecking truck as the vehicle to be towed is lifted and the weight thereof is imposed on the towing device, and since such disposition of the pivots of the linkage will cause the rear end of the lifting member to rise higher than its forward end, a greater clearance will be provided between the lifting member and the mud shields and splash pan of the towed vehicle.

By locating the vertical pivot for the towing device close to the rear end of the towing truck, the towed vehicle is kept in line with the towing truck, thus avoiding obstruction to traffic or danger of collision in turning corners or on curves as results from towing devices using lifting beams as heretofore employed wherein the turning movement for the towed vehicle was located at the extreme rear end of the beam.

By providing clamps which are constructed separately from the lifting member and attachable thereto, the placing of the lifting member beneath the axle or other suitable part of the vehicle to be towed is facilitated, since the lifting member may be readily lowered directly onto the pavement or road surface before the clamps have been applied, thus providing a lifting member of minimum height and enabling the lifting member to be placed beneath an axle having a minimum clearance beneath it, and the clamps may be easily applied and secured in place after the vehicle to be towed has been lifted.

We claim as our invention:

1. A towing device comprising a mounting having means for rigidly securing it on a towing vehicle, an elongated lifting member adapted to be placed beneath a part of a vehicle to be towed, upper and lower link means between said mounting and lifting member and operative to guide said member for vertical movement bodily when raised or lowered, a vertical pivot supported rigidly in upright position between said mounting and lifting member to sustain the tilting force exerted on said member by the load thereon of the vehicle to be towed, said member being swingable about said pivot as a vertical axis, means on the lifting member cooperable with a part of the vehicle to be towed to hold the latter thereon, and means for raising the lifting member.

2. A towing device comprising an elongated lifting member adapted to be placed beneath a part of a vehicle to be towed, means including upper and lower links pivoted to the lifting member for guiding said member for upward and downward movement while maintaining it in a substantially horizontal position, a vertical pivot having means for rigidly supporting it on a towing vehicle and supporting said guiding means on a towing vehicle for movement relatively thereto about a vertical axis and supporting said guiding means to sustain the tilting force exerted on the lifting member by the load of the vehicle to be towed, and means for raising said lifting member.

3. A towing device comprising an elongated automobile lifting member, a vertical pivot having means for rigidly supporting it on a towing vehicle, means including upper and lower links pivoted to the lifting member and supported on said vertical pivot for guiding said member for raising and lowering movements, said vertical pivot supporting the guiding means to sustain the tilting force exerted on the lifting member by a vehicle to be towed and thereby maintaining the lifting member in a substantially horizontal position, and means connected to the lifting member for raising it.

4. A towing device comprising an elongated lifting member adapted to be placed beneath a part of a vehicle to be towed, a vertical pivot having means for rigidly mounting it on a towing vehicle, a support mounted on said pivot for pivotal movement about a vertical axis, upper and lower links connecting said support and lifting member and supported by said pivot to sustain tilting force exerted by the load of the vehicle to be towed on the lifting member and thereby maintain the lifting member in a substantially horizontal position during raising and lowering movements thereof, and means for raising the lifting member.

5. A towing device comprising an elongated lifting member embodying a body portion and telescopic sections having means for securing them in different adjusted positions and adapted to be placed beneath a part of a vehicle to be towed, a vertical pivot having means for rigidly mounting it on a towing vehicle, a support mounted on said pivot for pivotal movement about a vertical axis, and a connection between said support and the body portion of the lifting member supported by said vertical pivot to sustain tilting force exerted on the lifting member by the load of the vehicle to be towed and thereby maintain the lifting member in a substantially horizontal position during raising and lowering movements thereof.

6. A towing device comprising an elongated lifting member adapted to be placed beneath a part of a vehicle to be towed, means for supporting said member on a towing vehicle for swinging movement laterally about a vertical axis, and a brake operative to prevent lateral swing of the lifting member by its own weight about said axis.

7. A towing device comprising an elongated lifting member adapted to be placed beneath a part of a vehicle to be towed, a vertical pivot having means for rigidly mounting it on a towing vehicle, a support mounted on said pivot for pivotal movement about a vertical axis, upper and lower link connections between said support and lifting member and supported by said vertical pivot to sustain the tilting force exerted by the load of the vehicle to be towed on the lifting member and thereby guide the latter for movement bodily upwardly and downwardly, and means for raising said lifting member.

8. A towing device comprising an elongated lifting member adapted to be placed beneath a part of a vehicle to be towed, a support having means for mounting it on a towing vehicle for pivotal movement about a vertical axis, and means mounted on said support for guiding said member for raising and lowering movement bodily, said guiding means being partially detachable by tilting of the lifting member upwardly to render the lifting member foldable.

9. A towing device comprising an elongated lifting member adapted to be placed beneath a part of a vehicle to be towed, a support having means for mounting it on a towing vehicle for pivotal movement about a vertical axis, a parallel motion connection between said support and lifting member and operative to guide the latter for movement bodily upwardly and downwardly, said parallel motion connection being partially detachable to render the lifting member foldable into a position over said support.

10. A towing device comprising an elongated lifting member adapted to be placed beneath a part of a vehicle to be towed, a support having means for mounting it on a towing vehicle for pivotal movement about a vertical axis, and upper and lower links connected to said support and the lifting member for guiding the latter for movement bodily upwardly and downwardly, the connection of the lower links being detachable to render the lifting member foldable.

11. A towing device comprising an elongated lifting member adapted to be placed beneath a part of a vehicle to be towed, a support having means for mounting it on a towing vehicle, means for lifting and lowering said member, and means connected to said support and to one end of the lifting member and operative to guide said member for simultaneous upward or downward movement at both ends but cause the end of said member remote from said support to move through a greater vertical distance than its other end.

12. A towing device comprising a support having means for mounting it on a towing vehicle, an elongated lifting member adapted to be placed beneath a part of a vehicle to be towed, and means connecting said support and one end of the lifting member to support the latter in a substantially horizontal position and to guide it for simultaneous upward or downward movement at both ends but cause its remote end to move through a greater vertical distance than its end connected to said support.

13. A towing device comprising a support having means for mounting it on a towing vehicle, an elongated lifting member adapted to be placed beneath a part of a vehicle to be towed, and upper and lower links connecting said support to one end of the lifting member and operative to guide the latter for simultaneous upward or downward movement at both ends, the pivots of said links being located to cause the end of the lifting member remote therefrom to travel through a greater vertical distance than the end thereof connected to said links during upward or downward movement of the lifting member.

14. A towing device comprising a support having means for mounting it on a towing vehicle, an elongated lifting member pivotally connected to said support to swing relatively thereto about a vertical axis and adapted to be placed beneath a part of a vehicle to be towed, clamps adjustable along and having means for individually clamping them to said member frictionally at any points along its length and close to opposite sides of said part of the towed vehicle, and means for raising said lifting member.

15. In or for a towing device comprising a lifting member adapted to be placed beneath a part of a vehicle to be towed, an adaptor bar adapted to be placed on and secured to said member and carrying spherically-surfaced upwardly-convexed elements adapted to have a universal bearing engagement with the spring cups of the axle of the vehicle.

16. The combination of a towing vehicle, a support mounted thereon, a lifting member adapted to be placed beneath a part of a vehicle to be towed, means pivotally connecting said support to one end of the lifting member and operative to guide the latter for vertical movement while maintaining it in a position projecting substantially horizontally from the towing vehicle, said connecting means being partially disconnectible by an upward swing of the lifting member to enable the lifting member to be folded over said support and onto the towing vehicle.

17. The combination of a towing vehicle, a support mounted thereon, a lifting member adapted to be placed beneath a part of a vehicle to be towed, and means embodying upper and lower link means pivotally connecting said support to one end of the lifting member for movement bodily upwardly or downwardly while projecting substantially horizontally from the towing vehicle, the lower link means being disconnectible to render the lifting member foldable over said support and onto the towing vehicle.

18. The combination of a towing vehicle, a support mounted thereon, a rest on said vehicle, a lifting member adapted to be placed beneath a part of a vehicle to be towed, means pivotally connecting said support to one end of the lifting member and operative to guide the latter for vertical movement while maintaining it in a position projecting substantially horizontally from the towing vehicle, said connecting means being partially disconnectible by upward tilting of the lifting member to enable the lifting member to be swung upwardly over said support and onto said rest on the towing vehicle.

19. The combination of a towing vehicle, a vertical pivot having means for rigidly supporting it in upright position on the rear end of said vehicle, a support mounted on said vertical pivot for pivotal movement about a vertical axis, an elongated lifting member adapted to be placed beneath a part of a vehicle to be towed, upper and lower link means connecting said support to an end of the lifting member and supported by said vertical pivot to sustain tilting force exerted on the lifting member by the load of the vehicle to be towed and thereby guide said member for simultaneous upward and downward movement at both ends during raising and lowering thereof, and means connected to said member for lifting it.

20. The combination of a towing vehicle, a rigid framework secured to said vehicle, a vertical pivot rigidly supported in upright position by said framework, a support mounted on said vertical pivot for pivotal movement about a vertical axis, an elongated lifting member adapted to be placed beneath a part of a vehicle to be towed, means including upper and lower links connecting one end of the lifting member to said support to swing lateraly about said vertical pivot as an axis and supported by said vertical pivot to sustain tilting force exerted on the lifting member by the load of the vehicle to be towed and thereby maintain said member in a substantially horizontal position during raising and lowering thereof, and means connected to the lifting member adjacent to its connection to said connecting means for lifting said member.

21. In or for a towing device comprising a lifting member adapted to be placed beneath spring cups of the axle of a vehicle to be towed, an adaptor bar adapted to be placed on said lifting member, and a pair of substantially spherically-surfaced balls adapted to enter the spring cups of the vehicle and movable longitudinally on said bar to accommodate them to such spring cups.

22. An adaptor to be placed beneath centrally apertured spring cups of the axle of a vehicle to be lifted and towed, comprising a bar, and a pair of substantially hemi-spherical balls engageable in the apertures of the spring cups and freely movable longitudinally of said bar to adjust themselves automatically to the distance apart of the spring cups.

E. W. HOLMES.
E. W. HOLMES, Jr.